US010859208B2

(12) United States Patent
Tamburello et al.

(10) Patent No.: US 10,859,208 B2
(45) Date of Patent: Dec. 8, 2020

(54) HEAT TRANSFER UNIT FOR PREFABRICATED VESSEL

(71) Applicant: Savannah River Nuclear Solutions, LLC, Aiken, SC (US)

(72) Inventors: David A. Tamburello, Aiken, SC (US); Anthony J. McWilliams, Aiken, SC (US)

(73) Assignee: Savannah River Nuclear Solutions, LLC, Aiken, SC (US)

( * ) Notice: Subject to any disclaimer, the term of this patent is extended or adjusted under 35 U.S.C. 154(b) by 90 days.

(21) Appl. No.: 15/994,446

(22) Filed: May 31, 2018

(65) Prior Publication Data

US 2019/0368660 A1  Dec. 5, 2019

(51) Int. Cl.
| | | |
|---|---|---|
| *F28F 1/20* | (2006.01) | |
| *F17C 13/00* | (2006.01) | |
| *F28D 1/047* | (2006.01) | |
| *F28D 1/02* | (2006.01) | |
| *F28F 1/12* | (2006.01) | |
| *F28F 1/24* | (2006.01) | |

(52) U.S. Cl.
CPC .......... *F17C 13/002* (2013.01); *F28D 1/0206* (2013.01); *F28D 1/0472* (2013.01); *F28F 1/124* (2013.01); *F28F 1/24* (2013.01); *F17C 2227/0304* (2013.01); *F17C 2227/0309* (2013.01); *F17C 2227/0341* (2013.01); *F17C 2227/0397* (2013.01); *F17C 2250/0631* (2013.01); *F28D 2001/0273* (2013.01)

(58) Field of Classification Search
CPC ............ F17C 13/002; F17C 2227/0304; F17C 2227/0309; F17C 2227/0341; F17C 2227/0397; F17C 2250/0631; F28D 1/0206; F28D 1/0472; F28D 2001/0273; F28F 1/124; F28F 1/24
USPC ........................................................ 165/181
See application file for complete search history.

(56) References Cited

U.S. PATENT DOCUMENTS

| | | | | |
|---|---|---|---|---|
| 1,953,500 A | * | 4/1934 | Price .......................... | F28G 7/00 165/84 |
| 2,300,663 A | * | 11/1942 | Fette ........................ | F28F 3/083 165/77 |
| 3,286,078 A | * | 11/1966 | Hynes ....................... | H05B 3/58 392/472 |
| 3,519,795 A | * | 7/1970 | Kinney ..................... | H05B 3/80 392/448 |

(Continued)

FOREIGN PATENT DOCUMENTS

| | | |
|---|---|---|
| DE | 273496 | 11/1989 |
| FR | 2918742 | 1/2009 |
| GB | 2377746 | 1/2003 |

*Primary Examiner* — Claire E Rojohn, III
(74) *Attorney, Agent, or Firm* — Dority & Manning, P.A.

(57) ABSTRACT

Vessel assemblies, heat transfer units for prefabricated vessels, and methods for heat transfer prefabricated vessel are provided. A heat transfer unit includes a central rod, and a plurality of peripheral rods surrounding the central rod and connected to the central rod. The plurality of peripheral rods are movable between a first collapsed position and a second bowed position, wherein in the second bowed position a midpoint of each of the plurality of peripheral rods is spaced from the central rod relative to in the first position. The heat transfer unit further includes a heat transfer element connected to one of the plurality of peripheral rods.

20 Claims, 4 Drawing Sheets

(56) References Cited

U.S. PATENT DOCUMENTS

| | | | | |
|---|---|---|---|---|
| 4,595,297 | A * | 6/1986 | Liu | G01K 7/04 165/158 |
| 4,835,366 | A | 5/1989 | Owen et al. | |
| 5,046,556 | A * | 9/1991 | Andersson | F28F 1/30 165/181 |
| 5,193,359 | A * | 3/1993 | Martin | F25B 39/02 165/146 |
| 5,214,938 | A * | 6/1993 | Kennedy | F25B 39/02 165/146 |
| 5,357,758 | A * | 10/1994 | Andonian | A62B 7/06 62/45.1 |
| 5,584,264 | A * | 12/1996 | Moyer | F22B 37/146 122/235.11 |
| 6,178,766 | B1 * | 1/2001 | Tong | F28F 1/126 62/305 |
| 6,378,605 | B1 * | 4/2002 | Kutscher | F28B 1/06 165/181 |
| 6,516,142 | B2 | 2/2003 | Grant | F24H 1/102 392/451 |
| 7,559,689 | B2 * | 7/2009 | Harty | F17C 5/06 374/165 |
| 7,637,292 | B2 * | 12/2009 | Handa | F17C 5/007 141/82 |
| 7,681,604 | B2 * | 3/2010 | Handa | F17C 13/001 141/82 |
| 7,938,150 | B2 * | 5/2011 | Handa | F17C 5/007 141/82 |
| 8,100,151 | B2 * | 1/2012 | Handa | F17C 1/00 141/82 |
| 8,139,931 | B1 | 3/2012 | Griffin | |
| 9,365,109 | B2 * | 6/2016 | Bork | B60K 15/035 |
| 2003/0026604 | A1 | 2/2003 | Hollyday et al. | |
| 2006/0244264 | A1 * | 11/2006 | Anderson | F03D 1/04 290/44 |
| 2008/0047498 | A1 | 2/2008 | Hollyday et al. | |
| 2008/0105691 | A1 * | 5/2008 | Schlag | F17C 7/00 220/581 |
| 2009/0151920 | A1 * | 6/2009 | Polcyn | F28D 15/0275 165/185 |
| 2009/0159258 | A1 | 6/2009 | Handa | |
| 2010/0220984 | A1 | 9/2010 | Potier et al. | |
| 2010/0239236 | A1 | 9/2010 | Anliker | |
| 2011/0155742 | A1 | 6/2011 | Garcia-Lorenzana et al. | |
| 2011/0247354 | A1 * | 10/2011 | Asai | F24F 5/0046 62/324.6 |
| 2011/0270147 | A1 | 11/2011 | Lauber et al. | |
| 2015/0136273 | A1 * | 5/2015 | Tamburello | F25B 5/02 141/82 |
| 2015/0166261 | A1 * | 6/2015 | Tamburello | F17C 13/00 165/58 |
| 2016/0075508 | A1 * | 3/2016 | Tamburello | B65D 88/748 165/46 |
| 2016/0245590 | A1 * | 8/2016 | Myerholtz, Jr. | F28F 9/013 |

* cited by examiner

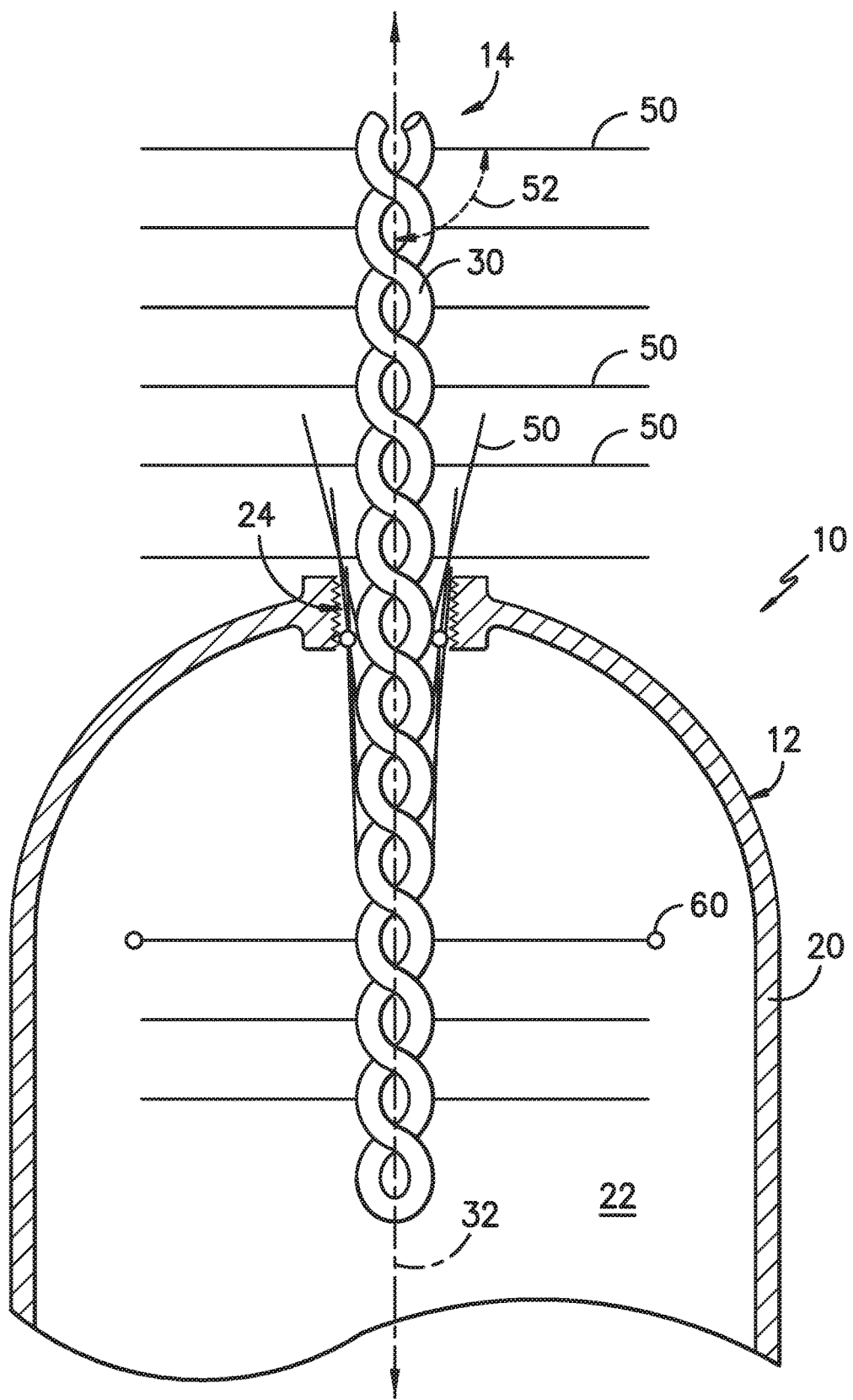
FIG. -1-

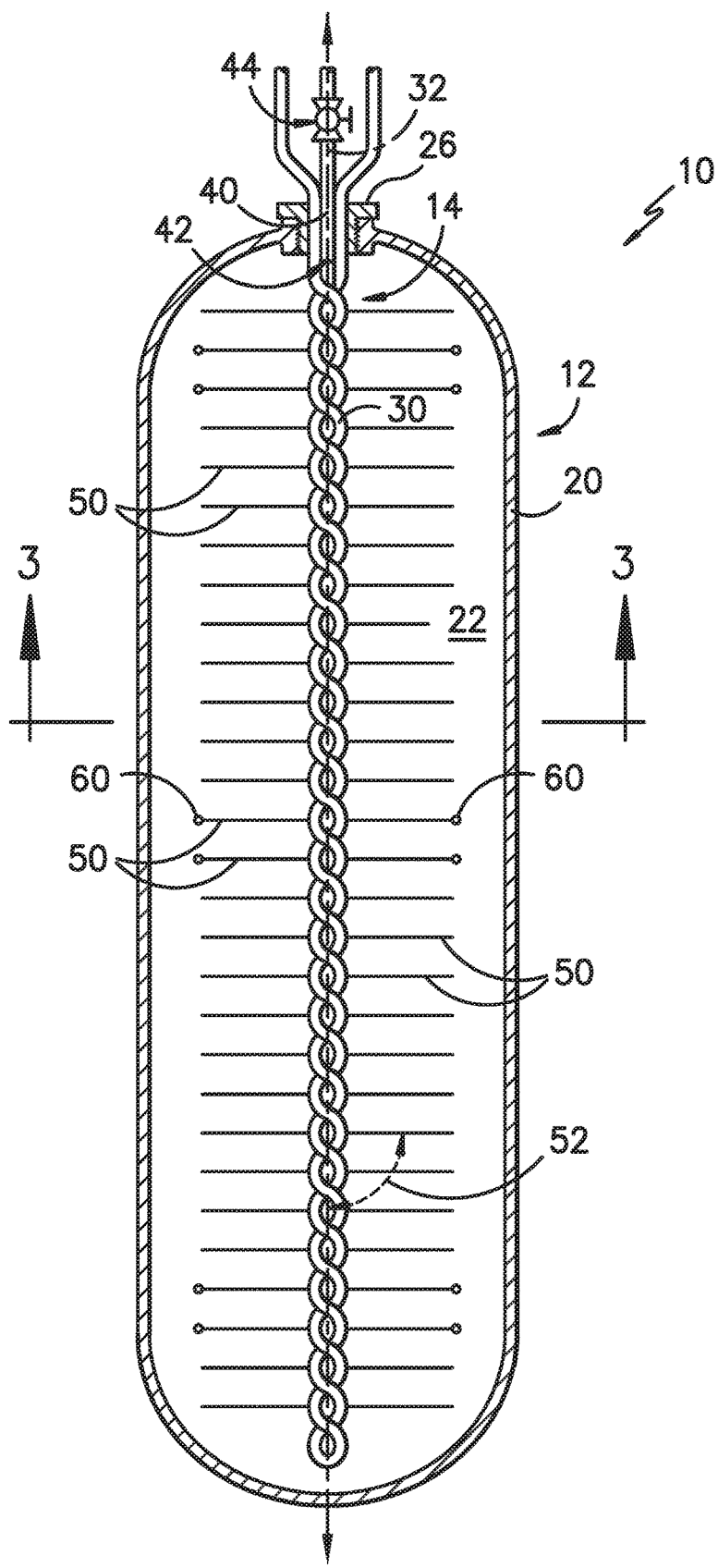
FIG. -2-

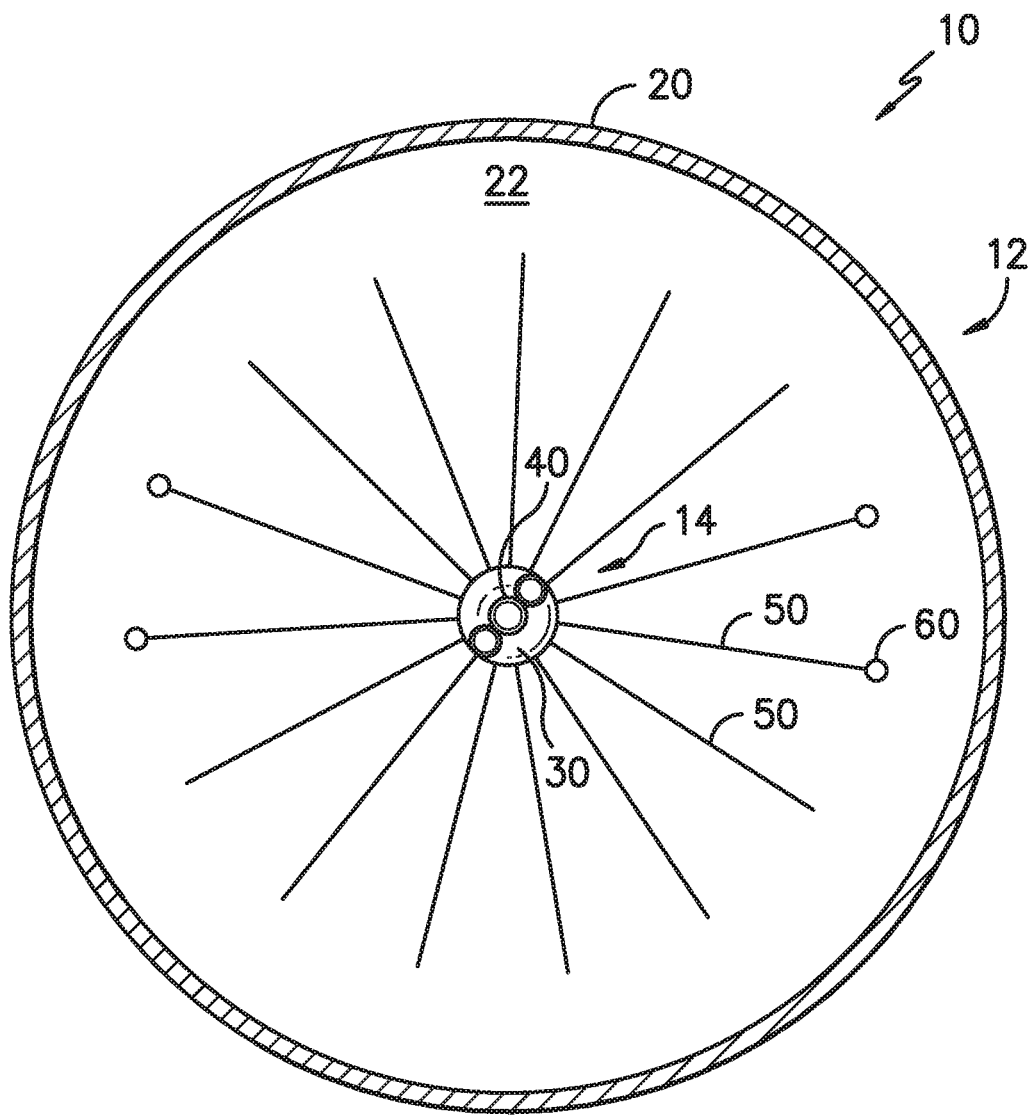
FIG. -3-

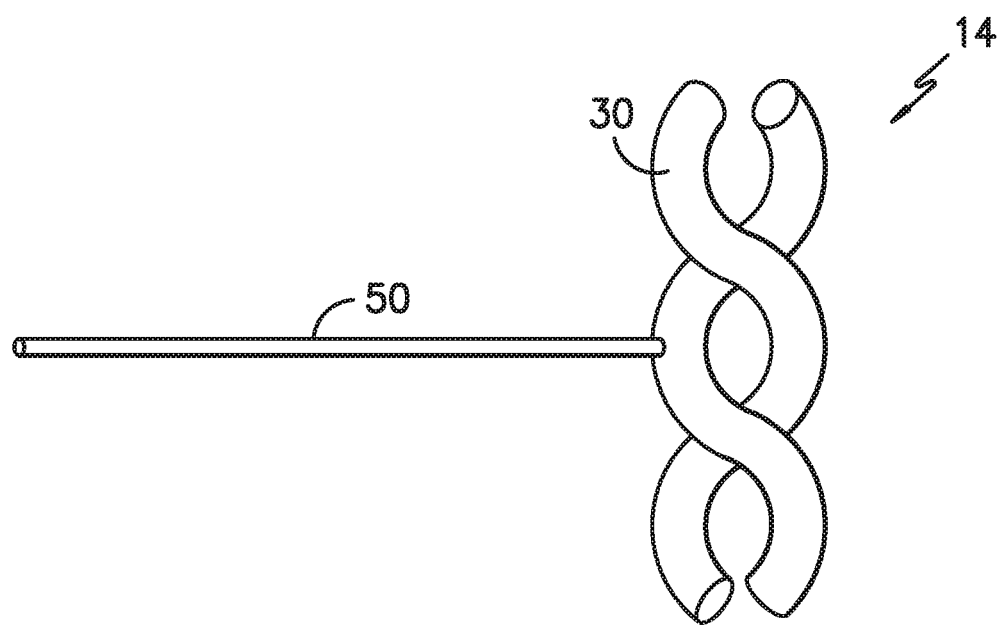
FIG. -4-
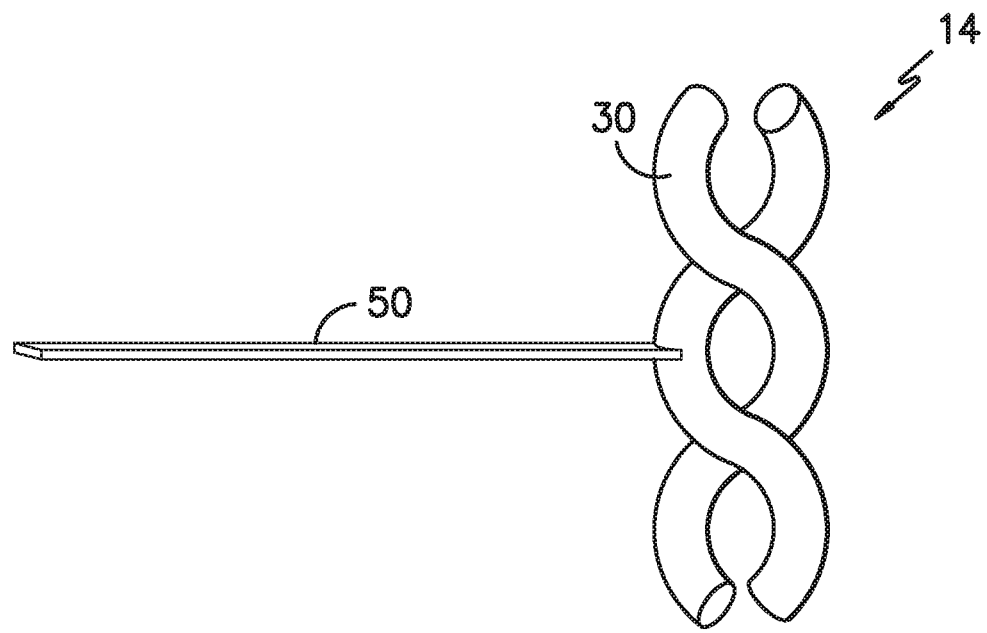
FIG. -5-

HEAT TRANSFER UNIT FOR PREFABRICATED VESSEL

FEDERAL RESEARCH STATEMENT

This invention was made with Government support under Contract No. DE-AC09-08SR22470, awarded by the U.S. Department of Energy. The Government has certain rights in the invention.

FIELD OF THE INVENTION

The present disclosure is related generally to heat transfer units for use in prefabricated vessels, such as pressure vessels.

BACKGROUND OF THE INVENTION

Vessels for storage of substances such as liquids or gases have been utilized in a variety of industries for a variety of purposes. For example, pressure vessels have been utilized for hydrogen, natural gas, and other gas storage needs. In particular, vessels have been utilized in mobile gas storage markets, such as in the automotive industry, heavy machinery industry, and portable generator industry. Stationary gas storage markets have additionally utilized storage vessels for liquid or gas storage needs.

In general, it is desirable to maintain the fluids stored in a vessel at desired temperatures. Thus, heating of the fluids may be required in colder environments, and cooling of the fluids may be required in hotter environments. Presently known heat transfer units for storage vessels generally fall into three groups: large, bulky units around which a vessel must be manufactured; large, sectional units which include various sections, each of which must be individually inserted into the vessel and then assembled therein; and small units which can be inserted into the vessel in preassembled form but do not provide sufficient heat transfer throughout the entire vessel.

Each of these approaches has disadvantages. Large, bulky units require the time and expense of having vessels manufactured around the units, and the vessels must be destroyed to access the units. Large, sectional units require the time and expense of difficult in-vessel assembly. Small units have limited heat transfer capabilities.

Accordingly, improved heat transfer units for vessels, such as prefabricated vessels, are desired in the art. In particular, heat transfer units which can be efficiently inserted into prefabricated vessels, and which provide improved heat transfer capabilities throughout the vessels, would be advantageous.

BRIEF DESCRIPTION OF THE INVENTION

Aspects and advantages of the invention will be set forth in part in the following description, or may be apparent from the description, or may be learned through practice of the invention.

In accordance with one embodiment, the present disclosure is directed to a heat transfer unit for a prefabricated vessel. The heat transfer unit includes a central core extending along and defining a longitudinal axis, wherein the central core is operable to provide heat transfer. The heat transfer unit further includes a plurality of fins connected to the central core. Each of the plurality of fins extends from the central core at an angle to the longitudinal axis when in a base position. Each of the plurality of fins is flexible and biased towards the base position such that each of the plurality of fins returns to about the respective base position when not under the influence of an external biasing force.

In accordance with another embodiment, the present disclosure is directed to a vessel assembly. The vessel assembly includes a prefabricated vessel including a shell, the shell defining an interior. The vessel further includes a heat transfer unit insertable into the interior of the prefabricated vessel. The heat transfer unit includes a central core extending along and defining a longitudinal axis, wherein the central core is operable to provide heat transfer. The heat transfer unit further includes a plurality of fins connected to the central core. Each of the plurality of fins extends from the central core at an angle to the longitudinal axis when in a base position. Each of the plurality of fins is flexible and biased towards the base position such that each of the plurality of fins returns to about the respective base position when not under the influence of an external biasing force.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 provides a front sectional view of a heat transfer unit being inserted into a vessel in accordance with embodiments of the present disclosure;

FIG. 2 provides a front sectional view of a heat transfer unit after insertion into a vessel in accordance with embodiments of the present disclosure;

FIG. 3 is a sectional view, along the line 3-3 of FIG. 2, of a heat transfer unit after insertion into a vessel in accordance with embodiments of the present disclosure;

FIG. 4 is a close-up perspective view of a portion of a heat transfer unit in accordance with embodiments of the present disclosure; and FIG. 5 is a close-up perspective view of a portion of a heat transfer unit in accordance with embodiments of the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, terms of approximation, such as "generally", "about", or "approximately", include values within twenty percent greater or less than the stated value. When used in the context of an angle or direction, such terms include within twenty degrees greater or less than the stated angle or direction. For example, "generally vertical" includes directions within twenty degrees of vertical in any direction, e.g., clockwise or counter-clockwise.

The present disclosure is generally directed to heat transfer units for use in prefabricated vessels. A unit in accordance with the present disclosure includes a central core which provides heat transfer. For example, the central core may be a tube through which a heat transfer fluid may be flowed, or may be a rod which can be heated or cooled (for example via an electric heater or thermoelectric cooler) to facilitate heat transfer. Further, a plurality of fins may be connected to the central core. Each fin may extend into the vessel when inserted therein. Further, each fin may have a base position and be flexible such that the fin can be moved from that base position by an external biasing force. However, each fin may further be biased towards the base position such that, when the external biasing force is removed, the fin returns to about the base position. Such design of the fins advantageously allows for efficient heat transfer within the vessel (i.e. from the core through the fins to the vessel interior fluid). Additionally, such design facilitates easy and efficient insertion of the unit into and removal of the unit from the vessel, without for example requiring destruction of the vessel to access the unit.

Referring now to FIGS. 1 through 3, embodiments of a vessel assembly 10 in various positions are illustrated. Vessel assembly 10 may include a prefabricated vessel 12 and a heat transfer unit 14. A prefabricated vessel 10 is generally a vessel 12 constructed independently of a heat transfer unit 14, and which may be utilized to store a fluid, such as a gas or liquid. Some examples of such fluids include hydrogen and natural gas, although it should be understood that the present disclosure is not limited to such examples. In some exemplary embodiments, a vessel 10 may be pressure vessel 10, designed to contain a fluid at a pressure above atmospheric. A vessel 12 may include, for example, a shell 20 generally defining an interior 22 of the vessel 12. An opening 24 may further be defined by the shell 20 for accessing the interior 22.

In some embodiments, the stored fluid may be provided into the vessel 12 separately from the heat transfer unit 14. Alternatively, the stored fluid may be supplied through the heat transfer unit 14. In some embodiments, vessel 12 may further include, for example, a cap 26 which may fit into opening 24 to close and/or generally seal the interior 22 of the vessel 12. Alternatively, as shown, heat transfer unit 14 may include the cap 26 such that the heat transfer unit 14 also closes and/or generally seals the interior 22 of the vessel 12. Cap may, for example, include outer threads which interface with inner threads of the portion of the shell 20 defining the opening 24, or may alternatively utilize another suitable closure/sealing mechanism to facilitate closing and/or sealing of the interior 22.

Referring now also to FIGS. 4 and 5, heat transfer unit 14 may be insertable into the interior 22 of vessel 12 through opening 24. As shown, heat transfer unit 14 may include a central core 30 which extends along and defines a longitudinal axis 32 (which may for example correspond to a centerline axis of the vessel 12). The central core 30 may be operable to provide heat transfer. For example, in some embodiments, the central core 30 may be a tube. Further, a heat transfer fluid may be disposed within and flowable through the tube to facilitate heat transfer within the interior 22. Alternatively, the central core 30 may be a rod. In these embodiments, the rod may be heated or cooled to facilitate heat transfer within the interior 22. In some embodiments, the central core 30 may extend generally linearly along the longitudinal axis 32. Alternatively, as shown, the central core 30 may have a coiled structure (such as around the axis 32) or a helical structure, which may in exemplary embodiments be a double helical or double helix structure. The helical structure may be formed from a single member (tube, rod, etc.) or from multiple members.

In exemplary embodiments, the helical structure may be formed from a metal. For example, steel (which in some embodiments may be stainless steel), copper, or aluminum may be utilized. Alternatively, other suitable materials which facilitate heat transfer (such as by being electrically or thermally conductive) may be utilized.

When the heat transfer unit 14 is inserted into the vessel 12, portions of the central core 30 may remain exterior to the vessel 12. This allows heat transfer fluid, electricity, etc. to be applied to the central core 30 to facilitate heat transfer within the interior 22. For example, a fluid inlet, valve, and/or suitable electric connector mechanism may be provided in the central core 30 exterior to the vessel 12.

In some embodiments, the heat transfer unit 14 may further include a fluid supply tube 40. The fluid supply tube 40 may supply fluid to be stored in the interior 22 of the vessel 12 to the interior 22, such as through one or more outlet openings 42 defined in the tube 40. In some embodiments, the tube 40 may extend along the longitudinal axis 32. For example, in embodiments wherein the central core 30 has a helical structure, the tube 40 may extend through the helical structure such that the central core wraps helically around the tube 40. An opening 42 of the tube 40 may be at a longitudinal end of the tube 40, and/or one or more openings 42 may be defined along the length of the tube 40. Additionally, a valve 44 may be included on the tube 40 to regulate the flow of fluid through the tube 40 into the interior 22. When the heat transfer unit 14 is inserted into the vessel 12, the valve 44 may remain exterior to the vessel 12. The fluid supply tube 40 may extend only slightly into the interior 22, such as just past the opening 24 as shown, or may extend through a significant portion of a length of the vessel 12.

Heat transfer unit 14 may further include a plurality of fins 50 which are connected to the central core 30. Such connection of each fin 50 to the central core 30 may be a rigid connection, such as via brazing, welding, or another suitable connection method. In some embodiments, a fin 50 may be connected on one end to the central core 30, with the other end extending therefrom. In other embodiments, a fin 50 may extend through the central core 30 and be connected to the central core 30 at a midpoint of the fin 50, such that both ends extend from the central core 30. In general, the plurality of fins 50 may be arranged in one or more rows along the longitudinal axis 32, and each row may include one or more fins 50 which may for example be arranged in an annular array.

In some embodiments, one or more of the fins 50 may provide heat transfer. Such fins 50 may in some embodiments be formed from a metal. For example, steel (which in some embodiments may be stainless steel), copper, or aluminum may be utilized. Alternatively, other suitable materials which facilitate heat transfer (such as by being electrically or thermally conductive) may be utilized. Heat may be transferred to such fins 50 from the central core 30 via contact with the central core 30.

Additionally or alternatively, one or more fins 50 may include an auxiliary device 60 coupled thereto, as discussed herein. Such fins 50 may or may not provide heat transfer.

Accordingly, such fins 50 may be formed from a material suitable for heat transfer, as discussed above. Alternatively, such fins 50 may be formed from a suitable plastic or other non-conductive material.

FIG. 4 illustrates one embodiment of a fin 50 in accordance with the present disclosure. In these embodiments, fin 50 is a pin, and thus has a generally circular cross-sectional profile. FIG. 5 illustrates another embodiment of a fin 50 in accordance with the present disclosure. In these embodiments, fin 50 is a ribbon, and thus has a generally rectangular cross-sectional profile which is generally flat. Alternatively, other suitable shapes and cross-sectional profiles may be utilized. In some embodiments, one or more fins 50 may extend linearly, while in additional or alternative embodiments, one or more fins 50 may extend curvilinearly.

Each fin 50 may extend from the central core 30, such as at an angle 52 to the longitudinal axis 32, when in a base position. The base position is generally a position that each fin 50 generally assumes when not under the influence of an external biasing force which moves the fin 50 relative to this position. In some embodiments, for example, the angle 52 may be between 0 degrees and 80 degrees from perpendicular to the longitudinal axis 32, such as between 0 degrees and 70 degrees from perpendicular to the longitudinal axis 32, such as between 0 degrees and 60 degrees from perpendicular to the longitudinal axis 32. It should be understood that the plurality of fins 50 need not each have the same angle 52. For example, for some fins, the angle 52 may be between 0 degrees and 20 degrees from perpendicular to the longitudinal axis 32, such as between 0 degrees and 15 degrees from perpendicular to the longitudinal axis 32, such as between 0 degrees and 10 degrees from perpendicular to the longitudinal axis 32.

Each fin 50 may be sufficiently rigid to assume the base position when not under the influence of an external biasing force. However, each fin 50 may further be relatively flexible and elastically deformable, resulting in a bias towards the base position. Accordingly, when an external biasing force is applied to a fin 50, the fin 50 may move/bend/pivot from the base position. However, when the external biasing force is removed, the fin 50 may return to about the base position.

For example, as discussed, FIG. 1 illustrates the unit 14 being inserted into a vessel 12. During such insertion, the fins 50 may each encounter resistance due to contact with the exterior of the shell 20. As the unit 14 enters the vessel 12 through the opening 24, each fin 50 may move/bend/pivot due the external basing force resulting from contact with the shell 20. Each fin 50 may thus be moved to a position which allows entry through the opening 24. Once the fin 50 passes through the opening 24 and is fully in the interior 22, such that any external biasing force via contact, etc., has been removed, the fin 50 may return to the base position, as shown in FIGS. 1 and 2.

As discussed, in some embodiments, a heat transfer unit 14 may further include one or more auxiliary devices 60 coupled to one or more fins 50. An auxiliary device 60 may be utilized to, for example measure various characteristics of the fluid within the vessel 12, take samples of the fluid, etc. For example, an auxiliary device 60 may be a sensor, such as a chemical sensor; a sampling device, such as a pitot tube; a thermocouple; or a pressure transducer.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A heat transfer unit for a prefabricated vessel, the heat transfer unit comprising:
    a central core extending along and defining a longitudinal axis, wherein the central core is operable to provide heat transfer;
    a plurality of fins connected to the central core, each of the plurality of fins extending from the central core at an angle to the longitudinal axis when in a base position such that at least one end of each of the plurality of fins is distal from the central core, each of the plurality of fins being flexible and biased towards the base position such that each of the plurality of fins returns to about the respective base position when not under an influence of an external biasing force,
    wherein each of the plurality of fins moves from the respective base position due to contact with the prefabricated vessel as the heat transfer unit is inserted into the prefabricated vessel such that entry of the heat transfer unit into the prefabricated vessel is permitted, the contact causing the external biasing force, and wherein each of the plurality of fins returns to about the respective base position when the contact and resulting external biasing force has been removed.

2. The heat transfer unit of claim 1, wherein the central core is a tube.

3. The heat transfer unit of claim 2, further comprising heat transfer fluid disposed within the tube.

4. The heat transfer unit of claim 1, wherein the central core is a rod.

5. The heat transfer unit of claim 1, wherein the central core has a helical structure.

6. The heat transfer unit of claim 5, further comprising a fluid supply tube, the fluid supply tube extending through the helical structure.

7. The heat transfer unit of claim 1, wherein the central core is formed from a metal.

8. The heat transfer unit of claim 7, wherein the metal is one of steel, copper, or aluminum.

9. The heat transfer unit of claim 1, wherein each of the plurality of fins is a pin.

10. The heat transfer unit of claim 1, wherein each of the plurality of fins is a ribbon.

11. The heat transfer unit of claim 1, wherein each of the plurality of fins is formed from a metal.

12. The heat transfer unit of claim 1, wherein each of the plurality of fins is formed from a plastic.

13. The heat transfer unit of claim 1, further comprising an auxiliary device coupled to at least one of the plurality of fins.

14. The heat transfer unit of claim 1, further comprising a fluid supply tube.

15. A vessel assembly, comprising:
    a prefabricated vessel comprising a shell, the shell defining an interior; and
    a heat transfer unit insertable into the interior of the prefabricated vessel, the heat transfer unit comprising:
        a central core extending along and defining a longitudinal axis, wherein the central core is operable to provide heat transfer;

a plurality of fins connected to the central core, each of the plurality of fins extending from the central core at an angle to the longitudinal axis when in a base position such that at least one end of each of the plurality of fins is distal from the central core, each of the plurality of fins being flexible and biased towards the base position such that each of the plurality of fins returns to about the respective base position when not under an influence of an external biasing force, wherein each of the plurality of fins moves from the respective base position due to contact with the prefabricated vessel as the heat transfer unit is inserted into the prefabricated vessel such that entry of the heat transfer unit into the prefabricated vessel is permitted, the contact causing the external biasing force, and wherein each of the plurality of fins returns to about the respective base position when the contact and resulting external biasing force has been removed.

16. The vessel assembly of claim 15, wherein the central core is a tube.

17. The vessel assembly of claim 15, wherein the central core is a rod.

18. The vessel assembly of claim 15, wherein the central core has a helical structure.

19. The vessel assembly of claim 15, further comprising an auxiliary device coupled to at least one of the plurality of fins.

20. The vessel assembly of claim 15, further comprising a fluid supply tube.

* * * * *